United States Patent [19]

Gee et al.

[11] Patent Number: 5,661,215
[45] Date of Patent: Aug. 26, 1997

[54] MICROEMULSIONS OF GEL-FREE POLYMERS

[75] Inventors: Ronald Paul Gee; Burt Michael Wrolson, both of Midland, Mich.

[73] Assignee: Dow Corning Corporation, Midland, Mich.

[21] Appl. No.: 506,717

[22] Filed: Jul. 26, 1995

[51] Int. Cl.$^6$ ............................................. C08L 83/08
[52] U.S. Cl. ................................. 524/837; 528/34
[58] Field of Search ............................ 524/837; 528/34

[56] References Cited

U.S. PATENT DOCUMENTS 4,935,464 6/1990 Ona et al. ............................ 524/837

FOREIGN PATENT DOCUMENTS 459500 12/1991 European Pat. Off. .

*Primary Examiner*—Margaret W. Glass
*Attorney, Agent, or Firm*—James L. DeCesare

[57] ABSTRACT

Described is a method of preparing microemulsions of organopolysiloxanes, by copolymerizing a cyclic siloxane and a polyfunctional silane, in an aqueous medium containing a nonionic surfactant, an anionic or cationic surfactant, and a catalyst, until the desired increase in molecular weight is obtained. The invention resides in controlling the gel content of the organopolysiloxanes in the microemulsion by control of the concentration of silane and concentration of silanol in the resulting organopolysiloxane, such that a functionality ratio $\phi$ results in formation of a gel-free polymer molecular weight distribution of finite organopolysiloxane species in the microemulsion.

12 Claims, No Drawings

MICROEMULSIONS OF GEL-FREE POLYMERS

BACKGROUND OF THE INVENTION

This invention is directed to microemulsions of gel-free polymers, and to a method for making polysiloxane emulsions using what is commonly known as emulsion polymerization. Microemulsions are produced from a mixture of a siloxane oligomer, a hydrolyzable water-soluble alkoxysilane, a cationic or anionic surfactant, a nonionic surfactant, a catalyst, and water. Silicon containing reactants react in the presence of water and surfactants to form polysiloxane emulsions. By using our method, it is feasible to produce microemulsions of gel-free polymers.

Our invention is an improvement on methods described in European Patent Application 0 459 500 (EP 459500), published Dec. 4, 1991, assigned to the assignee of our invention. While EP 459500 teaches similar techniques for making microemulsions, it does not teach how to avoid gelation of non-linear siloxane polymers.

Polysiloxane emulsions are categorized by the size of the polysiloxane particles and the appearance of the emulsion. The art recognizes three categories of silicone emulsions, (i) standard emulsions, (ii) fine emulsions, and (iii) microemulsions. Silicone standard emulsions have a large particle size greater than 300 nanometers and appear to the human eye to be opaque and impenetrable to light. Silicone standard emulsions have an intense white appearance. Silicone fine emulsions have a smaller particle size from 140–300 nanometers and visually are slightly opaque to very slightly translucent. Fine emulsions transmit light but with distortion. Silicone microemulsions have a particle size less than 140 nanometers and visually appear translucent to transparent and transmit light without distortion. Microemulsions are most desired due to smaller particle size, higher stability, and translucent to transparent appearance.

Emulsions of polysiloxanes in water can be made by mechanically or by emulsion polymerization. Mechanically means taking the preformed polysiloxane and using mechanical apparatus such as a homogenizer or vigorous agitator to emulsify the siloxanes in water. A surfactant can be added to the polysiloxane or water to aid the emulsification process.

Emulsion polymerization to which our invention pertains entails combining silicon containing reactants, surfactants, polymerization catalyst, and water. The mixture is stirred and the silicon containing reactants are allowed to polymerize until a microemulsion is formed. Alkoxysilanes, cyclic siloxanes, and combinations of alkoxysilanes and cyclic siloxanes can be used as reactants to form the microemulsion.

While techniques in EP 459500 have been largely successful in producing suitable microemulsions of linear siloxane polymers, they do not provide for avoidance of polymer gelation when production of a non-linear siloxane polymer microemulsion is the desired product, which is the essence and contribution of our invention.

SUMMARY OF THE INVENTION

This invention relates to a composition and a process for producing polysiloxane microemulsions containing a gel-free polymer molecular weight distribution. According to our process, polyfunctional alkoxysilanes and permethylcyclic siloxanes are copolymerized in the presence of nonionic, and an anionic or cationic surfactant. A gel-free polymer molecular weight distribution is observed within a specific range of the functionality ratio provided the polyfunctional monomer is dispersed throughout the polymer in a nearly random manners. The functionality ratio $\phi$ is the molar ratio of initial polyfunctional silane to remaining total silanol.

Our process may be illustrated by reference to the following three scenarios where DBSA is dodecylbenzene sulfonic acid:

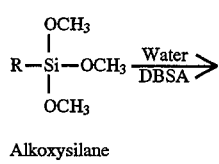

Alkoxysilane

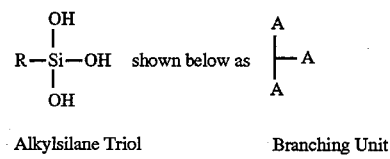

Alkylsilane Triol      Branching Unit

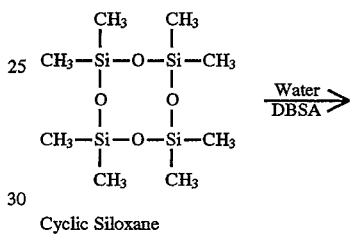

Cyclic Siloxane

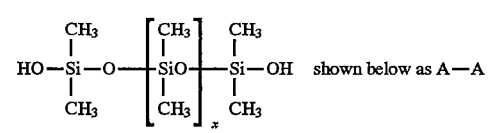

Silanol Terminated Siloxane

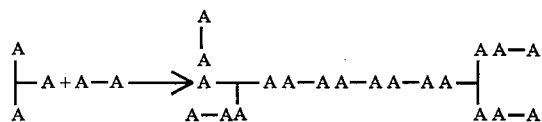

The concentration of polyfunctional monomer (alkoxysilane) is controlled by the initial charge of ingredients to the reactor (recipe), whereas the concentration of silanol is controlled by prevailing reaction temperatures and particle sizes. The specific functionality range which results in a gel-free polymer molecular weight distribution of "finite" polymeric species is theoretically defined in relation to a gel point, or the point of incipient heterogeneity in the polymer molecular weight distribution. The functionality ratio at the gel point $\phi_g$ is theoretically defined as:

$$\phi_g \text{ theoretical} = \rho/(1-p_g).$$

$\rho$ and $p_g$ are in turn defined by the following equation where $\alpha_g$ has the value 0.5. Thus:

$$\alpha_g = 0.5 = \frac{p_g \rho}{1 - p_g(1-\rho)}$$

where;

$\alpha_g$ is the branching coefficient relating to polyfunctional monomer structure, ρ is the ratio of initial polyfunctional silane (i.e. complete hydrolysis of all alkoxysilane groups present in the formulation) to initial total silanol (i.e. complete hydrolysis of all alkoxysilane groups present in the formulation plus complete hydrolysis of all cyclosiloxane species), and $p_g$ is the molar conversion of silanol at the gel point or the moles of total $\equiv$SiOH consumed at the gel point divided by the initial total silanol.

It is understood that the simplest theoretical prediction of the gel point requires that all condensation reactions are intermolecular and the reactivities of HO(Me$_2$SiO)H and MeSi(OH)$_3$ are equal. Since both of these requirements are unlikely to apply to the emulsion copolymerization of a permethylcyclic siloxane and a polyfunctional silane, $\phi$ can be empirically determined from the following equation:

$$\phi\ observed = \frac{(f)[R_nSiO_{(4-n)/2}](MWSiOH)}{[SiOH](MWR_nSiO_{(4-n)/2})}$$

where;

f is silane functionality, i.e. 3 for MeSi(OMe)$_3$ and 4 for Si(OEt)$_4$, brackets [ ] are units of concentration (w/w) for $R_nSiO_{(4-n)/2}$ and SiOH, MWSiOH is molecular weight of silanol, MWR$_n$SiO$_{(4-n)/2}$ is molecular weight of branched site, n is 0 or 1, and R is CH$_3$—, CH$_3$(CH$_2$)$_2$—, CH$_3$(CH$_2$)$_7$—, or CH$_3$(CH$_2$)$_{11}$—, for example.

If the functionality ratio $\phi$ is less than the functionality ratio at the gel point $\phi_g$, the polymer molecular weight distribution will be gel-free (unimodal) and contain only "finite" species. If the functionality ratio $\phi$ is at the functionality ratio at the gel point $\phi_g$, the polymer molecular weight will not be gel-free (unimodal), but will contain a soluble polymer fraction and a gel fraction (bimodal). As the functionality ratio $\phi$ increases beyond the functionality ratio at the gel point $\phi_g$, the gel fraction will become more predominant until a complete network forms. The average size of network will be bounded by the average diameter of the polymer particles.

It is not believed that the functionality ratio $\phi$ has been previously used to control the gel content, i.e. molecular weight distribution, of nonlinear silicone emulsion polymers. According to our invention, the relative rate at which the two monomers (alkoxysilane and cyclic siloxane) are introduced into the reactor is not critical, as long as irreversible homopolymerization of the polyfunctional monomer (alkoxysilane) does not occur. The functionality ratio, $\phi$, of a highly nonrandom copolymer would have no predictive value. It is believed that the extremely high surface area unique to microemulsions facilitates mass transfer of water soluble siloxane species between particles, thereby providing a mechanism for rapid siloxane redistribution within the entire system. Thus, if reversible homopolymerization of the polyfunctional monomer occurs, rearrangement reactions will ensure a random distribution of branching within the polymer.

Due to the reversible nature of ionic siloxane polymerizations, a lightly crosslinked siloxane gel in microemulsion form can be rearranged to form 100% sol. For purposes of this application, the term "sol" is used in the sense of denoting a finite polymeric species, i.e. "gel-free". This is accomplished by manipulation of the polymerization temperature. In emulsion systems of this type, the equilibrium concentration of silanol in the polymer is directly proportional to the reaction temperature. Thus, $\phi$ is inversely proportional to the reaction temperature. If a given set of processing conditions result in $\phi$ being larger than $\phi_g$, then $\phi$ can be decreased to a value less than $\phi_g$ by simply increasing the reaction temperature after all of the microemulsion particles have been formed. The ability to recover sol would, of course, be dependent upon the physical constraints of the system. For example, a reaction temperature of 200° C. would be quite impractical.

The viscous dissipation factor of gel-free nonlinear emulsion polymers is higher than that of polymers of similar viscosity which contain a gel fraction. Therefore emulsions of gel-free polymers are useful in applications which require lubrication properties without excessive tackiness. For example, anionic or cationic emulsions of gel-free but branched silicone polymers of high viscosity are useful as hair conditioning agents.

While not being bound by metes and bounds, generally, our method entails making microemulsion containing particles with a size of about 25–70 nanometers (0.025–0.070 microns), using a nonionic, and a cationic or anionic surfactant, cyclic siloxane monomers such as octamethylcyclotetrasiloxane, and C$_1$–C$_{12}$ alkyltrialkoxysilanes or tetraalkoxysilanes. With a molar ratio of silane to cyclic siloxane of 0.0001–0.02, a polymer viscosity of 1000–5,000,000 centistokes (mm$^2$/s) can be produced. $\phi$ should range from 0.0001 to the experimentally determined gel point $\phi_g$.

These and other features and objects of the invention will become apparent from a consideration of the detailed description.

DETAILED DESCRIPTION OF THE INVENTION

The emulsions of this invention are made from a siloxane oligomer, a hydrolyzable water soluble alkoxysilane, either a cationic or anionic surfactant, a nonionic surfactant, a catalyst, and water. In some cases, an anionic surfactant can also act as catalyst thereby eliminating the need for a catalyst. In other cases, some cationic surfactants have nonionic characteristics, eliminating the need for a nonionic surfactant.

Polymerization according to the method of our invention involves the opening of a cyclic siloxane ring using an acid or base catalyst in the presence of water. Upon opening of the ring, polysiloxanes oligomers with terminal hydroxy groups are formed. These polysiloxane oligomers then react with each other or with other silicon containing reactants in the reaction medium, through a condensation reaction to form polysiloxane polymers or copolymers.

The siloxane oligomers are cyclic siloxanes of formula:

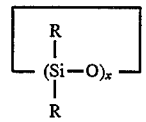

where each R is a saturated or unsaturated alkyl group of 1–6 carbon atoms, an aryl group of 6–10 carbon atoms, and x is 3–7. R can optionally contain a functional group which is unreactive in the ring opening and polymerization reaction.

Suitable R groups are methyl, ethyl, propyl, phenyl, allyl, vinyl, and —R$^1$F. R$^1$ is an alkylene group of 1–6 carbon atoms or an arylene group of 6–10 carbon atoms, and F is a functional group such as an amine, diamine, halogen, carboxy, or mercapto. R can also be —R¹F¹R where R¹ and R are described above and F¹ is a non-carbon atom such as oxygen, nitrogen, or sulfur.

Cyclic siloxanes useful in our invention include compounds such as hexamethylcyclotrisiloxane, octamethylcyclotetrasiloxane, decamethylcyclopentasiloxane, tetramethyltetravinylcyclotetrasiloxane, tetramethyltetraphenylcyclotetrasiloxane, and mixtures thereof.

We make copolymers in the emulsion polymerization reaction by having present in the reaction medium a small portion of other silicon containing reactants. These reactants may be any compound that contains a hydrolyzable or silanol group and is capable of polymerization using emulsion polymerization. The other reactant should be water-soluble, and included at a level less than 2 mole percent of the total silicone content.

Examples of other silicon containing reactants include organofunctional siloxanes such as hydroxy endblocked polysiloxanes, exemplified by silanol terminated polydimethylsiloxanes with a degree of polymerization between 1–7.

Most preferred, however, are hydrolyzable water-soluble alkoxysilanes $RSi(OR')_3$ or $(R'O)_4Si$ where R is an organic group, preferably containing 1–12 carbon atoms, such as an unsubstituted alkyl group $C_nH_{2n+1}$, or an aryl group. R' in hydrolyzable group —(OR') is an alkyl group containing 1–6 carbon atoms. Silanes $RSi(OR')_3$ are therefore alkoxysilanes with neutral organic groups R.

Tetraalkoxysilanes $(R'O)_4Si$ are best exemplified by tetramethoxysilane, tetraethoxysilane, tetrapropoxysilane, and tetrabutoxysilane.

Hydrolyzable water-soluble alkoxysilanes $RSi(OR')_3$ with neutral organic groups R are exemplified by methyltrimethoxysilane, ethyltrimethoxysilane, propyltrimethoxysilane, n-butyltrimethoxysilane, hexyltrimethoxysilane, octyltrimethoxysilane, octyltriethoxysilane, dodecyltrimethoxysilane, dodecyltriethoxysilane, and phenyltrimethoxysilane.

Hydrolyzable water-soluble alkoxysilanes $RSi(OR')_3$ with cationic organofunctional groups R exemplified by amino functional silanes are not included in our invention.

Our emulsions contain a silicone concentration of 10–70% by weight of the total emulsion solution, preferably 25–60%. While emulsions with less than 10% silicone content can be made, such emulsions hold little or no economic value.

The reaction to polymerize the silicon containing reactants and form emulsions is carried out in a reactor containing a reaction medium of water, at least one cationic or anionic (ionic) surfactant, at least one nonionic surfactant, and a catalyst. Any catalyst capable of polymerizing cyclic siloxanes in the presence of water is useful in our method. Catalysts include condensation polymerization catalysts capable of cleaving siloxane bonds, for example strong acids such as substituted benzene sulfonic acids, aliphatic sulfonic acids, hydrochloric acid, and sulfuric acid; and strong bases such as quaternary ammonium hydroxides and metal hydroxides. Anionic surfactants such as dodecylbenzene sulfonic acid (DBSA) can additionally function as catalyst. Other useful catalytic systems include phase transfer catalysts such as tetrabutyl ammonium hydroxide or ion exchange resins where catalysts are formed in situ.

The catalyst is present in the reaction medium at levels of 0.01–30% by weight of total silicone. Strong acids and basic metal hydroxides can be used within the lower end of this range, while surfactants which also function as catalyst will be present at concentrations on the higher end of the range.

It is important that the reaction medium contain both an ionic and nonionic surfactant to stabilize the polysiloxane in the emulsion. Ionic surfactants can be cationic or anionic but surfactants known in the art as useful in emulsion polymerization.

Suitable anionic surfactants include but are not limited to sulfonic acids and their salt derivatives. Useful anionic surfactants are alkali metal sulfosuccinates; sulfonated glyceryl esters of fatty acids such as sulfonated monoglycerides of coconut oil acids; salts of sulfonated monovalent alcohol esters such as sodium oleyl isothionate; amides of amino sulfonic acids such as the sodium salt of oleyl methyl tauride; sulfonated products of fatty acid nitriles such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates; ether sulfates having alkyl groups of eight or more carbon atoms; and alkylaryl sulfonates having one or more alkyl groups of eight or more carbon atoms. Commercial anionic surfactants useful in our invention include dodecylbenzene sulfonic acid (DBSA) sold under the tradename BIOSOFT S-100 by Stepan Company, Northfield, Ill.; and the sodium salt of dodecylbenzene sulfonic acid sold under the tradename SIPONATE DS-10 by Alcolac Inc., Baltimore, Md.

Useful cationic surfactants are the various fatty acid amines, amides, and derivatives, and salts of fatty acid amines and amides. Cationic surfactants can be exemplified by aliphatic fatty amines and derivatives such as dodecyl amine acetate, octadecyl amine acetate, and acetates of amines of tallow fatty acids; homologues of aromatic amines having fatty chains such as dodecyl aniline; fatty amides derived from aliphatic diamines such as undecyl imidazoline; fatty amides derived from di-substituted amines such as oleylamino diethylamine; derivatives of ethylene diamine; quaternary ammonium compounds such as tallow trimethylammonium chloride, dioctadecyldimethyl ammonium chloride, didodecyldimethyl ammonium chloride, and dihexadecyldimethyl ammonium chloride; amide derivatives of amino alcohols such as beta-hydroxyethyl stearyl amide; amine salts of long chain fatty acids; quaternary ammonium bases derived from fatty amides of di-substituted diamines such as oleylbenzylamino ethylene diethylamine hydrochloride; quaternary ammonium bases of benzimidazolines such as methylheptadecyl benzimidazole hydrobromide; basic compounds of pyridinium and derivatives such as cetylpyridinium chloride; sulfonium compounds such as octadecyl sulfonium methyl sulfate; quaternary ammonium compounds of betaine such as betaine compounds of diethylamino acetic acid, and octadecylchloromethyl ether; urethanes of ethylene diamine such as condensation products of stearic acid and diethylene triamine; polyethylene diamines; and polypropanol polyethanol amines. Commercial cationic surfactants include products sold under the tradenames ARQUAD T-27W, 16–29, C-33, T-50; and ETHOQUAD T/13 and T/13 ACETATE; by Akzo Chemicals Inc., Chicago, Ill. The anionic or cationic surfactant is present at 0.05–30% by weight of total emulsion, preferably 0.5–20%.

Useful nonionic surfactants have a hydrophilic-lipophilic balance (HLB) of 10–20. Nonionic surfactants with HLB of less than 10 may be used but hazy solutions may result due to limited solubility of the nonionic surfactant in water. When using a nonionic surfactant with HLB less than 10, a nonionic surfactant with HLB greater than 10 should be added during or after polymerization. Commercial nonionic surfactants can be exemplified by 2,6,8-trimethyl-4- nonyloxy polyethylene oxyethanols (6EO) and (10EO) sold under the trademarks TERGITOL® TMN-6 and TERGITOL® TMN-10; alkyleneoxy polyethylene oxyethanol ($C_{11-15}$ secondary alcohol ethoxylates 7EO, 9EO, and 15EO) sold under the trademarks TERGITOL® 15-S-7, TERGITOL® 15-S-9, TERGITOL® 15-S-15; other $C_{11-15}$ secondary alcohol ethoxylates sold under the trademarks TERGITOL® 15-S-12, 15-S-20, 15-S-30, 15-S-40; and octylphenoxy polyethoxy ethanol (40EO) sold under the trademark TRITON® X-405. All of these surfactants are sold by Union Carbide Corporation, Danbury, Conn. Other commercial nonionic surfactants are nonylphenoxy polyethoxy ethanol (10EO) sold under the tradename MAKON 10 by Stepan Company, Northfield, Ill. One especially useful nonionic surfactant is polyoxyethylene 23 lauryl ether (Laureth-23) sold commercially under the tradename BRIJ 35 by ICI Surfactants, Wilmington, Del. The level of nonionic surfactant should be 0.1–40% by weight based on total weight of emulsion, preferably 0.5–30%.

Some commercially available ionic surfactants have characteristics of both ionic and nonionic surfactants combined, such as methyl polyoxyethylene (15) octadecyl ammonium chloride sold under the tradename ETHOQUAD 18/25 by Akzo Chemicals Inc., Chicago, Ill. It is a cationic quaternary ammonium salt with polyethylene oxide tails. When this type of ionic surfactant is used in our invention it is not necessary to have both ionic and nonionic surfactants in the reaction medium. Only the ionic surfactant having the nonionic characteristics is needed. If the ionic surfactant does not have characteristics of both ionic and nonionic surfactants, it is necessary to use both types of surfactants in the method of our invention. Surfactants such as ETHOQUAD 18/25 are typically used in the emulsion at levels equal to the level of ionic surfactants used.

Our method is preferably carried out by creating a mixture comprising a cyclic siloxane, hydrolyzable water-soluble alkoxysilane, ionic (cationic or anionic) surfactant, nonionic surfactant, water, and catalyst. The mixture is then heated with agitation at a polymerization reaction temperature until essentially all of the cyclic siloxane and silane are reacted and a stable, oil-free emulsion of gel-free polymer is formed. The time required for formation of the stable, oil-free emulsion of gel-free polymer will vary depending on the reactants and the reaction conditions.

The mixture of cyclic siloxane, silane, ionic surfactant, nonionic surfactant, water, and catalyst is not stable and will separate without some means of agitation. It is not necessary to have all of the cyclic siloxane and silane fully dispersed into the mixture during the reaction, however some means of agitation must be provided throughout the course of the reaction.

Combining the cyclic siloxane, silane, ionic surfactant, nonionic surfactant, water, and catalyst, and then reacting the cyclic siloxane and silane to form the emulsion can take place in several ways. The first to combine all ingredients with agitation, in any given order, and heat to the desired polymerization temperature with agitation, allowing the cyclic siloxane and silane to react and form an emulsion. Another way is to combine all ingredients with agitation, except for the catalyst, heat to the desired polymerization temperature, add the catalyst, and thereafter heat and agitate at the desired polymerization temperature, thereby allowing the cyclic siloxane and silane to react and form an emulsion. A third way is to combine all ingredients with agitation, except for the cyclic siloxane and silane, heat to the desired polymerization temperature, add or feed in the cyclic siloxane and silane, and thereafter heat and agitate at the desired polymerization temperature, thereby allowing the cyclic siloxane and silane to react and form an emulsion. It is not essential that the ingredients be combined in any given order. However, it is essential to have agitation during and following the addition of the ingredients, and to have achieved or to heat to the polymerization temperature when all of the ingredients have been combined.

The preferred method for forming emulsions is to create a mixture by combining the cyclic siloxane, mixture of cyclic siloxanes, silane, at least one nonionic surfactant, at least one ionic (cationic or anionic) surfactant, and water; providing agitation such that the cyclic siloxane and silane are fully dispersed in the mixture; heating to the polymerization temperature; and adding the catalyst. The mixture is then held at the polymerization temperature with agitation until a stable oil-free emulsion of gel-free polymer is formed.

The method may also be carried out by combining and mechanically emulsifying at least the cyclic siloxane and silane reactants, nonionic surfactant, and part of the water. Additional water, the ionic surfactant, and catalyst, can be added to the pre-emulsion with agitation. The mixture is then heated to the polymerization reaction temperature and held optionally with agitation until the monomers are consumed in forming the emulsion. Because of the formation and stability of the pre-emulsion, it is not necessary to have agitation during the course of the polymerization reaction.

Polymerization reaction temperatures are typically above the freezing point but below the boiling point of water. Pressures above or below atmospheric pressure allow operation outside of this range. At lower temperatures below room temperature, the polymerization reaction may proceed more slowly. The preferred temperature range is 50°–95° C.

The polymerization reaction can be stopped at the desired level of conversion of cyclic siloxane/silane and/or particle size by using known methods. It is preferred to stop the reaction when the largest amount of cyclic siloxane and silane have been reacted or when ring/chain equilibrium for the system and the desired particle size have been obtained. Reaction times of less than 24 hours, typically less than 5 hours, are sufficient to achieve the desired particle size and/or level of conversion. The methods for stopping the reaction encompass neutralization of the catalyst by addition of equal or slightly greater stoichiometric amounts of acid or base depending upon the type of catalyst. Either a strong or weak acid/base may be used to neutralize the reaction. Care must be taken when using a strong acid/base not to over neutralize, as it is possible to re-catalyze the reaction. It is preferred to neutralize with sufficient quantities of acid or base such that the resulting emulsion has a pH of less than 7 when a cationic surfactant is present, and a pH of greater than 7 when an anionic surfactant is present.

The equilibrium molecular weight of emulsion polymers is inversely proportional to temperature. Therefore, if a higher degree of polymerization (DP) is desired, a reduction of reaction temperature pursuant to particle formation will result in a higher molecular weight polymer. A useful range of temperature for this procedure is 10°–50° C.

A small quantity of alcohol can be added to the reaction medium before or after catalysis to increase the particle size of the emulsion. Alcohols useful in the method include methanol, ethanol and isopropanol. Since alcohols are typically used to break emulsions, it is preferred to keep the concentration of the alcohol at low levels, preferably below 5% by weight. To have the greatest effect on particle size, it is preferred to have the alcohol present throughout the course of the polymerization reaction.

In order to show how our invention is an improvement over EP 459500, the following example is set forth for purposes of comparison.

COMPARISON EXAMPLE I

This example shows the use of cyclic siloxanes and an organo silane such that there is copolymerization between the cyclic siloxanes and the silane. This example is, in principle, comparable to Example 11 of EP 459500, in that cyclic siloxanes and an organic trialkoxysilane are copolymerized in the presence of an ionic surfactant, a nonionic surfactant, and water. In Example 11 of EP 459500, cyclic siloxanes and a silane with cationic functionality N-(2-aminoethyl)-3-aminopropyltrimethoxysilane are copolymerized in the presence of a cationic surfactant (ARQUAD T-27W), a nonionic surfactant (MAKON 10), and water. In this comparison example, cyclic siloxanes and a silane with a neutral non-functional organic groups, i.e. methyltrimethoxysilane, are copolymerized in the presence of an anionic surfactant (dodecylbenzene sulfonic acid), a nonionic surfactant (BRIJ 35L), and water. This comparison example does not teach how to avoid gelation of the resulting siloxane polymer, nor is it taught in EP 459500.

644.0 grams of water, 131.6 grams of dodecylbenzene sulfonic acid (DBSA), and 10.5 grams of BRIJ 35L, were added to a reaction flask and,the contents heated to 80° C. 350.00 grams of cyclic siloxanes having an average of four silicon atoms per molecule were added with stirring to the mixture in the reaction flask at a rate of 1.94 grams per minute. About 30 minutes after the start of the cyclic siloxane feed, 7.0 grams of methyltrimethoxysilane MeSi(OMe)$_3$ were added to the mixture in the reaction flask at a rate of 0.467 grams per minute. The reaction was held at 80° C. for an additional three hours after the completion of the cyclic siloxane feed in order to reach equilibrium. 79.9 grams of an 85% aqueous solution of triethanolamine were added to neutralize the catalyst, which in this case was DBSA functioning as both catalyst and anionic surfactant. The resulting product was an oil-free microemulsion with a particle size of 36 nanometers (nm) as measured by a Nicomp Model 370 Submicron Particle Sizer. The conversion of monomer was approximately 96.0% by weight. The polymer was extracted from the emulsion by adding 10 grams of emulsion, 1.5 grams of anhydrous CaCl$_2$, 20 ml of methanol, and 25 ml of pentane to an appropriate container. The mixture was shaken vigorously, added to a plastic centrifuge tube, and centrifuged at 3000 rpm (314 rad/s) for 15 minutes. The top layer was removed from the tube, and stripped to yield only siloxane polymer. The shear viscosity of the extracted polymer was approximately 53,000 cp (mm$^2$/s) at a shear rate of 20.0 1/s (reciprocal seconds) using a Brookfield Model HBDV-III Viscometer. The molecular weight distribution of the polymer as measured by Gel Permeation Chromatography was comprised of one broad low molecular weight peak corresponding to sol (finite polymeric species) and one narrow high molecular weight peak corresponding to gel.

Our invention in contrast is represented by the following examples.

EXAMPLES WITHIN THE SCOPE OF OUR INVENTION

Example 1—Procedure—A

The following procedure illustrates the method used to collect data set forth below separately for each of our individual Examples 1–6 and 8. This procedure while being specific to Example 1, was used in Examples 2–6, 8, and Comparison Example II. A separate procedure is set forth below for Example 7. Thus, 644.0 grams of water, 131.6 grams of dodecylbenzene sulfonic acid and 10.5 grams of Brij 35L were added to a reaction flask, and the contents heated to 80° C. Once the temperature reached 80° C., 343.14 grams of cyclic siloxanes having an average of four silicon atoms per molecule, were added with stirring to the mixture in the reaction flask at a rate of 1.906 grams/minute. Approximately 30 minutes after the start of the cyclic siloxane feed, 7.0 grams of a mixture of methyltrimethoxysilane MeSi(OMe)$_3$ in cyclic siloxane (2.0% silane by weight) were added to the mixture in the reaction flask at a rate of 0.467 grams/minute. The reaction was held at 80° C. for an additional 3 hours after the completion of the cyclic siloxane feed to reach equilibrium. Subsequently, the temperature of the reaction flask was reduced to 10° C. to increase the molecular weight of the polymer. The flask contents were held at 10° C. for approximately 4 hours to reach the equilibrium concentration of silanol, then 79.9 grams of an 85% aqueous solution of triethanolamine was added to neutralize the catalyst. The resulting product was an oil-free microemulsion with a particle size of 37 nanometers (nm) measured by a Nicomp Model 370 Submicron Particle Sizer. The conversion of monomer was approximately 93.5% by weight. The polymer was extracted from the emulsion by adding 10 g of emulsion, 1.5 g of anhydrous CaCl$_2$, 20 ml of methanol, and 25 ml of pentane to an appropriate container. The mixture was shaken vigorously, added to a plastic centrifuge tube, and centrifuged at 3000 rpm for 15 minutes. The top layer was removed from the tube and stripped to yield only siloxane polymer. The shear viscosity of the extracted polymer was approximately 250, 000 mm$^2$/s at a shear rate of 6.0 s$^{-1}$ (reciprocal seconds 1/s), using a Brookfield Model HBDV-III Viscometer. The concentration of silanol in the polymer was approximately 454 ppm as measured by a Fourier-Transform Infrared Spectroscopy (FTIR)-deuteration technique. The FTIR-deuteration method was accomplished by subtraction of FTIR spectrum of a deuterated dilute solution of polydimethylsiloxane in CCl$_{14}$ from a spectrum of the same solution without deuteration. After correcting the spectrum for the presence of water, the absorbance at 3693 cm$^{-1}$ was correlated to the $\equiv$SiOH concentration. The concentration of MeSiO$_{3/2}$ in the polymer was approximately 256 ppm as measured by equilibration of polymer sample with a large excess of hexamethyldisiloxane in the presence of trifluoromethane sulfonic acid catalyst to yield the corresponding triorganosiloxy derivatives. The resultant solution was analyzed by internal standard gas chromatography to allow determination of the concentration of minor silicon substituents. The molecular weight distribution of the polymer measured by Gel Permeation Chromatography (GPC) was comprised of only one broad peak, and therefore this polymer contained only sol, denoting a finite polymeric species, i.e. "gel-free".

Example 1—Procedure—B

To experimentally determine the gel point, the reaction temperature is decreased if the polymer is known to contain only sol (finite polymeric species), or increased if the polymer is known to contain sol and gel. It is then held until a static concentration of silanol is achieved. The polymer is extracted from a sample of the emulsion, and a chromatogram is obtained of the molecular weight distribution. The reaction temperature is systematically adjusted until the molecular weight distribution is only slightly bimodal containing a soluble polymer fraction and a gel fraction), and this transition is defined as the gel point. This procedure was used to identify the gel point in Examples 2–7 and Comparison Example II.

Example 1

| Silane functionality f = 3 (i.e. methylsilsesquioxane $CH_3SiO_{3/2}$) | |
|---|---|
| Wt % Water | 56.68* |
| Wt % Dodecylbenzene sulfonic acid (Anionic) | 11.58* |
| Wt % Polyoxyethylene (23) lauryl ether (Nonionic) | 0.92* |
| Wt % Octamethylcyclotetrasiloxane | 30.80* |
| ppm Methyltrimethoxysilane | 123* |
| Reaction temperature (°C.) to form particles | 80 |
| Reaction temp. (°C.) to increase polymer molecular weight | 9–10 |
| Reaction temp. (°C.) at neutralization | 9–10 |
| Reaction temp. (°C.) at gelation of polymer, for reference | <9 |
| Particle size, Gaussian intensity weighted mean (nm) | 36.5 |
| Polymer characterization | Tables 1 & 2 |

*= amounts added to the reaction flask.

In Example 1, value 1.1 of $\phi$ was determined by:

$$\phi = \frac{(f)[R_nSiO_{(4-n)/2}](MWSiOH)}{[SiOH](MWR_nSiO_{(4-n)/2})} = \frac{(3)(256)(45)}{(454)(67)} = \frac{34560}{30418} = 1.1$$

where f is the silane functionality 3 for $MeSi(OMe)_3$, $[R_nSiO_{(4-n)/2}]$ is $CH_3SiO_{3/2}$ concentration measured on the resulting polymer as 256 ppm, [SiOH] is silanol concentration measured on the resulting polymer as 454 ppm, MWSiOH is the molecular weight of silanol SiOH (28+16+ 1), $MWR_nSiO_{(4-n)/2}$ is the molecular weight of a branched site as $CH_3SiO_{3/2}$ [12+3+28+(3×16)/2], n is 1, and R is $CH_3$. This same type of computation was used in determining the $\phi$ value in Examples 2–8, but is not shown in such detail.

Example 2

| Silane functionality f = 3 (i.e. methylsilsesquioxane $CH_3SiO_{3/2}$) | |
|---|---|
| Wt % Water | 56.61 |
| Wt % Dodecylbenzene sulfonic acid | 11.57 |
| Wt % Polyoxyethylene (23) lauryl ether | 0.92 |
| Wt % Octamethylcyclotetrasiloxane | 30.77 |
| ppm Methyltrimethoxysilane | 1230 |
| Reaction temperature (°C.) to form particles | 81 |
| Reaction temp. (°C.) to increase polymer molecular weight | N/A |
| Reaction temp. (°C.) at neutralization | 81 |
| Reaction temp. (°C.) at gelation of polymer, for reference | 23 |
| Particle size (nm) | 32.5 |
| Polymer characterization | Tables 1 & 2 |

Example 3

| Silane functionality f = 3 (i.e. propylsilsequioxane $C_3H_7SiO_{3/2}$) | |
|---|---|
| Wt % Water | 56.61 |
| Wt % Dodecylbenzene sulfonic acid | 11.57 |
| Wt % Polyoxyethylene (23) lauryl ether | 0.92 |
| Wt % Octamethylcyclotetrasiloxane | 30.76 |
| ppm Propyltrimethoxysilane | 1485 |
| Reaction temperature (°C.) to form particles | 80 |
| Reaction temp. (°C.) to increase polymer molecular weight | N/A |
| Reaction temp. (°C.) at neutralization | 80 |
| Reaction temp. (°C.) at gelation of polymer, for reference | 49 |
| Particle size (nm) | 33.4 |
| Polymer characterization | Tables 1 & 2 |

Example 4

| Silane functionality f = 3 (i.e. octylsilsesquioxane $C_8H_{17}SiO_{3/2}$) | |
|---|---|
| Wt % Water | 56.53 |
| Wt % Dodecylbenzene sulfonic acid | 11.57 |
| Wt % Polyoxyethylene (23) lauryl ether | 0.94 |
| Wt % Octamethylcyclotetrasiloxane | 30.72 |
| ppm Octyltriethoxysilane | 2500 |
| Reaction temperature (°C.) to form particles | 80 |
| Reaction temp. (°C.) to increase polymer molecular weight | N/A |
| Reaction temp. (°C.) at neutralization | 80 |
| Reaction temp. (°C.) at gelation of polymer, for reference | 50–80 |
| Particle size (nm) | 40.6 |
| Polymer characterization | Tables 1 & 2 |

Example 5

| Silane functionality f = 3 (i.e. dodecylsilsesquioxane $C_{12}H_{25}SiO_{3/2}$) | |
|---|---|
| Wt % Water | 56.50 |
| Wt % Dodecylbenzene sulfonic acid | 11.55 |
| Wt % Polyoxyethylene (23) lauryl ether | 0.92 |
| Wt % Octamethylcyclotetrasiloxane | 30.73 |
| ppm Dodecyltriethoxysilane | 3010 |
| Reaction temperature (°C.) to form particles | 80 |
| Reaction temp. (°C.) to increase polymer molecular weight | N/A |
| Reaction temp. (°C.) at neutralization | 80 |
| Reaction temp. (°C.) at gelation of polymer, for reference | 50 |
| Particle size (nm) | 36.3 |
| Polymer characterization | Tables 1 & 2 |

Example 6

| Silane functionality f = 4 (i.e. silicate $SiO_2$) | |
|---|---|
| Wt % Water | 56.65 |
| Wt % Dodecylbenzene sulfonic acid | 11.58 |
| Wt % Polyoxyethylene (23) lauryl ether | 0.93 |
| Wt % Octamethylcyclotetrasiloxane | 30.78 |
| ppm Tetraethoxysilane | 703 |
| Reaction temperature (°C.) to form particles | 80 |
| Reaction temp. (°C.) to increase polymer molecular weight | 51 |
| Reaction temp. (°C.) at neutralization | 51 |
| Reaction temp. (°C.) at gelation of polymer, for reference | 23 |
| Particle size (nm) | 35 |
| Polymer characterization | Tables 1 & 2 |

Example 7—Procedure

In this example, cationic surfactant is used, and the procedure in this example differs from the procedure in Examples 1–6 and 8 where an anionic surfactant is employed.

630.0 grams of water, 144.2 grams of ETHOQUAD T/13 cationic surfactant, 65.8 grams of TERGITOL® 15-S-12 nonionic surfactant, and 399.0 grams of cyclic siloxanes having an average of four silicon atoms per molecule, were added to a reaction flask and the contents heated to 85° C. 4.9 grams of a 50% aqueous catalyst solution of NaOH were added to the mixture in the reaction flask. About 8 hours after the addition of the NaOH catalyst, 22.2 grams of a mixture of methyltrimethoxysilane $MeSi(OMe)_3$ in cyclic siloxanes (11.3% silane by weight) were added to the mixture in the reaction flask at a rate of 0.37 grams per minute. The reaction was held at 85° C. for an additional four hours after the completion of the silane feed in order to reach equilibrium. Subsequently, the temperature of the reaction flask was reduced to 23° C. for approximately four hours, then 3.8 grams of glacial acetic acid were added to neutralize the catalyst. The resulting product was an oil-free microemulsion with a particle size of 61 nanometers (nm) as measured by a Nicomp Model 370 Submicron Particle Sizer. The conversion of monomer was not determined. The methods used to extract the polymer, measure the silanol concentration of the polymer, measure the methylsilsesquioxane concentration of the polymer, and obtain the molecular weight distribution of the polymer, were identical to the procedure described for Example 1.

Example 7

| Silane functionality f = 3 (i.e. methylsilsesquioxane $CH_3SiO_{3/2}$) | |
| --- | --- |
| Wt % Water | 50.54 |
| Wt % Ethoquad T/13 (Cationic) | 11.57 |
| Wt % Tergitol ® 15-S-12 (Nonionic) | 5.28 |
| Wt % Octamethylcyclotetrasiloxane | 32.01 |
| Wt % NaOH (50% aqueous solution) | 0.39 |
| ppm Methyltrimethoxysilane | 2000 |
| Reaction temperature (°C.) to form particles | 85 |
| Reaction temp. (°C.) to increase polymer molecular weight | 23 |
| Reaction temp. (°C.) at neutralization | 23 |
| Reaction temp. (°C.) at gelation of polymer, for reference | 6 |
| Particle size (nm) | 61 |
| Polymer characterization | Tables 1 & 2 |

Example 8

| Silane functionality f = 3 (i.e. methylsilsesquioxane $CH_3SiO_{3/2}$) | |
| --- | --- |
| Wt % Water | 56.64 |
| Wt % Dodecylbenzene sulfonic acid (Anionic) | 11.57 |
| Wt % Polyoxyethylene (23) lauryl ether (Nonionic) | 0.92 |
| Wt % Octamethylcyclotetrasiloxane | 30.80 |
| ppm Methyltrimethoxysiloxane | 615 |
| Reaction temperature (°C.) to form particles | 80 |
| Reaction temp. (°C.) to increase polymer molecular weight | 15 |
| Reaction temp. (°C.) at neutralization | 15 |
| Reaction temp. (°C.) at gelation of polymer, for reference | <15 |
| Particle size (nm) | 36 |
| Polymer characterization | Tables 1 & 2 |

Example 8 demonstrates the preparation of a high polymer viscosity of about 1 million $mm^2/s$ without the presence of a gel fraction.

In each of Examples 1–8 representing methods of our invention, the functionality ratio $\phi$ had a value less than the functionality ratio at the gel point $\phi_g$. This is shown in Table 1.

EXAMPLE OUTSIDE THE SCOPE OF OUR INVENTION

Example II—COMPARISON

| Silane functionality f = 3 (i.e. methylsilsesquioxane $CH_3SiO_{3/2}$) | |
| --- | --- |
| Wt % Water | 56.6 |
| Wt % Dodecylbenzene sulfonic acid | 11.6 |
| Wt % Polyoxyethylene (23) lauryl ether | 0.92 |
| Wt % Octamethylcyclotetrasiloxane | 30.8 |
| ppm Methyltrimethoxysilane | 1230 |
| Reaction temperature (°C.) to form particles | 81 |
| Reaction temp. (°C.) to increase polymer molecular weight | 10–11 |
| Reaction temp. (°C.) at neutralization | 10–11 |
| Reaction temp. (°C.) at gelation of polymer, for reference | 23 |
| Particle size (nm) | 34.9 |
| Polymer characterization | Tables 1 & 2 |

In Comparison Example II representing a method not according to our invention, functionality ratio $\phi$ (4.26) did not have a value less than the functionality ratio at the gel point $\phi_g$ (4.13). Therefore, the microemulsion polymer in Comparison Example II contained a soluble polymer fraction and a gel fraction. Tables 1 and 2 referred to above are shown below.

TABLE 1

Features of Polymer Molecular Weight Distribution

| Example | Gel Peak Present (†) | Sol Peak Present (†) | ppm $R_nSiO_{(4-n)/2}$ in Example Polymer | ppm SiOH in Example Polymer | $\phi$ | ppm $R_nSiO_{(4-n)/2}$ in Polymer at Gel Point (*) | ppm SiOH in Polymer at Gel Point (*) | $\phi_g$ |
| --- | --- | --- | --- | --- | --- | --- | --- | --- |
| 1 | No | Yes | 256 | 454 | 1.1 | not available | not available | >1.1 |
| 2 | No | Yes | 1077 | 1274 | 1.7 | 1124 | 548 | 4.1 |
| 3 | No | Yes | 2820 (‡) | 1114 | 3.6 | 2820 (‡) | 825 | 4.9 |
| 4 | No | Yes | 4940 (‡) | 1238 | 3.3 | 4940 (‡) | 792–1238 | 3.3–5.1 |
| 5 | No | Yes | 6600 (‡) | 1302 | 3.1 | 6600 (‡) | 911 | 4.4 |
| 6 | No | Yes | 677 (‡) | 838 | 2.4 | 677 (‡) | 554 | 3.7 |
| 7 | No | Yes | 2580 | 1056 | 4.9 | 2580 | 749 | 6.9 |
| 8 | No | Yes | 980 | 487 | 4.0 | not available | not available | >4.0 |
| II | Yes | Yes | 1044 | 494 | 4.3 | 1124 | 548 | 4.1 |

† = determined by Gel Permeation Chromatography
‡ = estimated value assuming 100% incorporation of silane
* The gel point corresponds to the incipient heterogeneity of the polymer molecular weight distribution

TABLE 2

Additional Characterization Data

| Example | Wt % Cyclics Conversion | Equilibrium Viscosity of Example Polymer (cs) | Equilibrium Viscosity of Polymer at Gel-Point (cs) |
|---|---|---|---|
| 1 | 93.4 | 250,000 at shear rate = 6.0 1/s | not available |
| 2 | 97.4 | 4,500 (shear rate not noted) | 128,000 at shear rate = 6.0 1/s |
| 3 | 98.9 | 14,000 at shear rate = 80.0 1/s | 112,000 at shear rate = 8.0 1/s |
| 4 | 97.9 | 16,000 at shear rate = 80.0 1/s | not available |
| 5 | 97.8 | 6,300 at shear rate = 200 1/s | 68,000 at shear rate = 16 1/s |
| 6 | 97.3 | not available | not available |
| 7 | not determined | 5,500 at shear rate = 200 1/s | not available |
| 8 | 92.6 | 1,300,000 at shear rate = 0.4 1/s | not available |
| II | 100 | 2,100,000 at shear rate = 0.4 1/s | 128,000 at shear rate = 6.0 1/s | cs = centistokes = mm²/sec
1/s = s⁻¹ = reciprocal seconds

That which is claimed is:

1. A method of preparing microemulsions of non-gelled organopolysiloxanes which comprises (i) copolymerizing a cyclic siloxane and an unsubstituted alkyltrialkoxysilane, an aryltrialkoxysilane, or a tetraalkoxysilane, by adding the silane to an aqueous medium containing the cyclic siloxane, a nonionic surfactant, an ionic surfactant, and a catalyst, until the desired increase in molecular weight is obtained, and (ii) controlling the gel content of the organopolysiloxane in the microemulsion by:

a. controlling the concentration of silane, and the concentration of silanol in the resulting organopolysiloxane, as a function of a functionality ratio $\phi$, b. the functionality ratio $\phi$ being a relationship defined according to the following formula:

$$\Phi = \frac{(f)\{R_nSiO_{(4-n)/2}\}(MWSiOH)}{\{SiOH\}(MWR_nSiO_{(4-n)/2})}$$

where f is silane functionality, $\{R_nSiO_{(4-n)/2}\}$ and $\{SiOH\}$ are concentrations of $R_nSiO_{(4-n)/2}$ and SiOH respectively in the resulting organopolysiloxane, (MWSiOH) is molecular weight of silanol, $(MWR_nSiO_{(4-n)/2})$ is molecular weight of a branched site, n is 0 or 1, and R is an organic group.

2. A method according to claim 1 in which the functionality ratio $\phi$ is maintained at a value less than the functionality ratio at the gel point $\phi_g$, the functionality ratio at the gel point $\phi_g$ having a value which is determined experimentally by gel permeation chromatography, and forming a polymer with a molecular weight distribution of gel-free organopolysiloxane in the microemulsion.

3. A method according to claim 2 in which the functionality ratio $\phi$ varies from 0.0001 to a value less than the functionality ratio at the gel point $\phi_g$.

4. A method according to claim 1 in which the silane is selected from the group consisting of methyltrimethoxysilane, ethyltrimethoxysilane, propyltrimethoxysilane, n-butyltrimethoxysilane, hexyltrimethoxysilane, octyltrimethoxysilane, octyltriethoxysilane, dodecyltrimethoxysilane, dodecyltriethoxysilane, phenyltrimethoxysilane, tetramethoxysilane, tetraethoxysilane, tetrapropoxysilane, and tetrabutoxysilane.

5. A method according to claim 1 in which the cyclic siloxane has the formula:

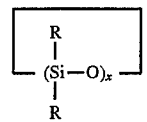

where R is a saturated or unsaturated alkyl group of 1–6 carbon atoms or an aryl group of 6–10 carbon atoms, R optionally containing a functional group which is unreactive in ring opening and polymerization reactions, and x is 3–7.

6. A method of preparing microemulsions of non-gelled organopolysiloxanes which comprises (i) copolymerizing a cyclic siloxane and an unsubstituted alkyltrialkoxysilane, an aryltrialkoxysilane, or a tetraalkoxysilane, by adding the silane to an aqueous medium containing the cyclic siloxane, a nonionic surfactant, an anionic surfactant, and a catalyst, until the desired increase in molecular weight is obtained, and (ii) controlling the gel content of the organopolysiloxane in the microemulsion by:

a. controlling the concentration of silane, and the concentration of silanol in the resulting organopolysiloxane, as a function of a functionality ratio $\phi$, forming a polymer molecular weight distribution of gel-free organopolysiloxane species in the microemulsion, b. the functionality ratio $\phi$ being a relationship defined according to the following formula:

$$\Phi = \frac{(f)\{R_nSiO_{(4-n)/2}\}(MWSiOH)}{\{SiOH\}(MWR_nSiO_{(4-n)/2})}$$

where f is silane functionality, $\{R_nSiO_{(4-n)/2}\}$ and $\{SiOH\}$ are concentrations of $R_nSiO_{(4-n)/2}$ and SiOH respectively in the resulting organopolysiloxane, (MWSiOH) is molecular weight of silanol, $(MWR_nSiO_{(4-n)/2})$ is molecular weight of a branched site, n is 0 or 1, and R is an organic group.

7. A method according to claim 6 in which the functionality ratio $\phi$ is maintained at a value less than the functionality ratio at the gel point $\phi_g$, the functionality ratio at the gel point $\phi_g$ having a value which is determined experimentally by gel permeation chromatography.

8. A method according to claim 7 in which the functionality ratio $\phi$ varies from 0.0001 to a value less than the functionality ratio at the gel point $\phi_g$.

9. A method according to claim 6 in which the silane is selected from the group consisting of methyltrimethoxysilane, ethyltrimethoxysilane, propyltrimethoxysilane, n-butyltrimethoxysilane, hexyltrimethoxysilane, octyltrimethoxysilane, octyltriethoxysilane, dodecyltrimethoxysilane, dodecyltriethoxysilane, phenyltrimethoxysilane, tetramethoxysilane, tetraethoxysilane, tetrapropoxysilane, and tetrabutoxysilane.

10. A method of preparing microemulsions of non-gelled organopolysiloxanes which comprises (i) copolymerizing a cyclic siloxane and a silane selected from the group consisting of methyltrimethoxysilane, ethyltrimethoxysilane, propyltrimethoxysilane, n-butyltrimethoxysilane, hexyltrimethoxysilane, octyltrimethoxysilane, octyltriethoxysilane, dodecyltrimethoxysilane, dodecyltriethoxysilane, phenyltrimethoxysilane, tetramethoxysilane, tetraethoxysilane, tetrapropoxysilane, and tetrabutoxysilane, by adding the silane to an aqueous medium containing the cyclic siloxane, a nonionic surfactant, an anionic surfactant, and a catalyst, until the desired increase in molecular weight is obtained, and (ii) controlling the gel content of the organopolysiloxane in the microemulsion by:

a. controlling the concentration of silane, and the concentration of silanol in the resulting organopolysiloxane, as a function of a functionality ratio φ, forming a polymer molecular weight distribution of gel-free organopolysiloxane species in the microemulsion, b. the functionality ratio φ being a relationship defined by the formula:

$$\Phi = \frac{(f)\{R_nSiO_{(4-n)/2}\}(MWSiOH)}{\{SiOH\}(MWR_nSiO_{(4-n)/2})}$$

where f is silane functionality, $\{R_nSiO_{(4-n)/2}\}$ and $\{SiOH\}$ are concentrations of $R_nSiO_{(4-n)/2}$ and SiOH respectively in the resulting organopolysiloxane, (MWSiOH) is molecular weight of silanol, $(MWR_nSiO_{(4-n)/2})$ is molecular weight of a branched site, n is 0 or 1, and R is an organic group.

11. A method of preparing microemulsions of non-gelled organopolysiloxanes which comprises (i) copolymerizing a cyclic siloxane and an unsubstituted tetraalkoxysilane, by adding the silane to an aqueous medium containing the cyclic siloxane, a nonionic surfactant, an ionic surfactant, and a catalyst, until the desired increase in molecular weight is obtained, and (ii) controlling the gel content of the organopolysiloxane in the microemulsion by:

a. controlling the concentration of silane, and the concentration of silanol in the resulting organopolysiloxane, as a function of a functionality ratio φ, b. the functionality ratio φ being a relationship defined according to the following formula:

$$\Phi = \frac{(f)\{R_nSiO_{(4-n)/2}\}(MWSiOH)}{\{SiOH\}(MWR_nSiO_{(4-n)/2})}$$

where f is silane functionality, $\{R_nSiO_{(4-n)/2}\}$ and $\{SiOH\}$ are concentrations of $R_nSiO_{(4-n)/2}$ and SiOH respectively in the resulting organopolysiloxane, (MWSiOH) is molecular weight of silanol, $(MWR_nSiO_{(4-n)/2})$ is molecular weight of a branched site, n is 0 or 1, and R is an organic group.

12. A method of preparing microemulsions of non-gelled organopolysiloxanes which comprises (i) copolymerizing a cyclic siloxane and an unsubstituted alkyltrialkoxysilane, an aryltrialkoxysilane, or a tetraalkoxysilane, by adding the silane to an aqueous medium containing the cyclic siloxane, a nonionic surfactant, an ionic surfactant, and a catalyst, until the desired increase in molecular weight is obtained, the molar ratio of the silane to the cyclic siloxane being 0.0001–0.02, and (ii) controlling the gel content of the organopolysiloxane in the microemulsion by:

a. controlling the concentration of silane, and the concentration of silanol in the resulting organopolysiloxane, as a function of a functionality ratio φ, b. the functionality ratio φ being a relationship defined according to the following formula:

$$\Phi = \frac{(f)\{R_nSiO_{(4-n)/2}\}(MWSiOH)}{\{SiOH\}(MWR_nSiO_{(4-n)/2})}$$

where f is silane functionality, $\{R_nSiO_{(4-n)/2}\}$ and $\{SiOH\}$ are concentrations of $R_nSiO_{(4-n)/2}$ and SiOH respectively in the resulting organopolysiloxane, (MWSiOH) is molecular weight of silanol, $(MWR_nSiO_{(4-n)/2})$ is molecular weight of a branched site, n is 0 or 1, and R is an organic group.

* * * * *